(12) United States Patent
Lee (10) Patent No.: US 11,106,597 B2
(45) Date of Patent: Aug. 31, 2021

(54) CONTROLLER, DATA STORAGE DEVICE AND OPERATING METHOD THEREOF (71) Applicant: SK hynix Inc., Gyeonggi-do (KR)

(72) Inventor: Min Ock Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 11 days.

(21) Appl. No.: 16/523,569

(22) Filed: Jul. 26, 2019

(65) Prior Publication Data
US 2020/0192821 A1 Jun. 18, 2020

(30) Foreign Application Priority Data
Dec. 13, 2018 (KR) .................. 10-2018-0161248

(51) Int. Cl.
G06F 12/00 (2006.01)
G06F 12/1081 (2016.01)
G06F 3/06 (2006.01)

(52) U.S. Cl.
CPC ........ *G06F 12/1081* (2013.01); *G06F 3/0604* (2013.01); *G06F 3/0655* (2013.01); *G06F 3/0679* (2013.01); *G06F 2212/621* (2013.01)

(58) Field of Classification Search
None
See application file for complete search history.

(56) References Cited

U.S. PATENT DOCUMENTS

2020/0233606 A1* 7/2020 Duan .................... G06F 3/0673
2020/0233611 A1* 7/2020 Chen .................... G06F 13/4234

FOREIGN PATENT DOCUMENTS

KR 1020020084725 11/2002

* cited by examiner

*Primary Examiner* — Midys Rojas
(74) *Attorney, Agent, or Firm* — IP & T Group LLP (57) ABSTRACT A controller for controlling an operation of a data storage device may include: a host interface configured to perform data communication with a host device; a memory configured to store firmware for controlling an operation of the host interface; and a processor configured to load the firmware to control the operation of the host interface. The firmware may generate transfer pattern information regarding previous data transfer operations by monitoring a data transfer status between the host interface and the host device, adjust an operation timing of the host interface based on the generated transfer pattern information, and control the host interface to perform a current data transfer operation according to the adjusted operation timing.

15 Claims, 8 Drawing Sheets

CONTROLLER, DATA STORAGE DEVICE AND OPERATING METHOD THEREOF

CROSS-REFERENCES TO RELATED APPLICATION

The present application claims priority under 35 U.S.C. § 119(a) to Korean application number 10-2018-0161248, filed on Dec. 13, 2018, in the Korean Intellectual Property Office, which is incorporated herein by reference in its entirety.

BACKGROUND

1. Technical Field

Various embodiments generally relate to a semiconductor device, and more particularly, to a controller, a data storage device and an operating method thereof.

2. Related Art

Recently, the paradigm for the computing environment has changed to the ubiquitous computing environment. Therefore, the use of portable electronic devices such as a mobile phone, digital camera and notebook computer has rapidly increased. Such portable electronic devices generally use a data storage device using a memory device. The data storage device is used to store data used in the portable electronic device.

Since the data storage device using a memory device has no mechanical driver, the data storage device has excellent stability and durability, exhibits high information access speed, and has low power consumption. Examples of the data storage device having such advantages include a universal serial bus (USB) memory device, a memory card having various interfaces, a universal flash storage (UFS) device, and a solid state drive (SSD).

SUMMARY

Various embodiments are directed to a technique for improving a performance of a data storage device.

In an embodiment, a controller may include: a host interface configured to perform data communication with a host device; a memory configured to store firmware for controlling an operation of the host interface; and a processor configured to load the firmware to control the operation of the host interface. The firmware may generate transfer pattern information regarding previous data transfer operations by monitoring a data transfer status between the host interface and the host device, adjust an operation timing of the host interface based on the generated transfer pattern information, and control the host interface to perform a current data transfer operation according to the adjusted operation timing.

In an embodiment, there is provided an operating method of a data storage device which includes a host interface for data communication with a host device. The operating method may include generating transfer pattern information regarding previous data transfer operations by monitoring data transfer statuses between the host interface and the host device; adjusting and operation timing of the host interface based on the generated transfer pattern information; and controlling the host interface to perform a current data transfer operation according to the adjusted operation timing.

DETAILED DESCRIPTION

Hereinafter, a controller, a data storage device and an operating method thereof according to the present disclosure will be described below with reference to the accompanying drawings through exemplary embodiments.

Figure 1:
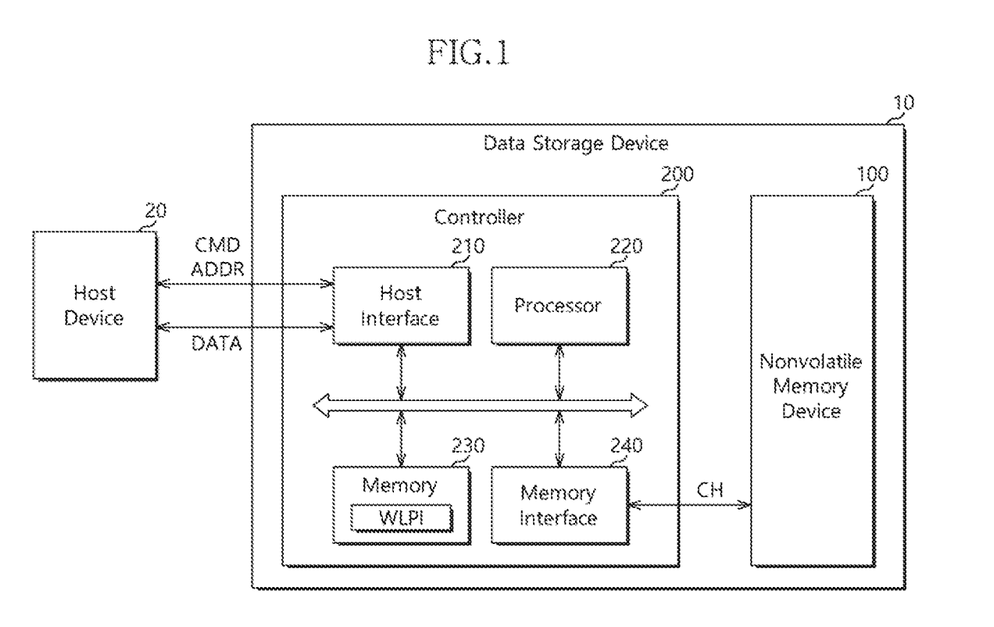
FIG. 1 is a diagram illustrating a data storage device in accordance with an embodiment.

FIG. 1 is a diagram illustrating a data storage device 10 in accordance with an embodiment.

Referring to FIG. 1, the data storage device 10 may store data accessed by a host device 20 such as a mobile phone, MP3 player, laptop computer, desktop computer, game machine, television (TV) or in-vehicle infotainment system. The data storage device 10 may be referred to as a memory system.

The data storage device 10 may be fabricated with various types of storage devices depending on an interface protocol coupled to the host device 20. For example, the data storage device 10 may be configured with any one of various types of storage devices which include a solid state drive (SSD), a multimedia card (MMC) such as an eMMC, RS-MMC or micro-MMC, a secure digital (SD) card such as a mini-SD or micro-SD card, a universal serial bus (USB) storage device, a universal flash storage (UFS) device, a personal computer memory card international association (PCMCIA) card-type storage device, a peripheral component interconnection (PCI) card-type storage device, a PCI express (PCI-e or PCIe) card-type storage device, a compact flash (CF) card, a smart media card, and a memory stick.

The data storage device 10 may be fabricated with various types of packages. For example, the data storage device 10 may be fabricated with any one of various types of packages such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 10 may include a nonvolatile memory device 100 and a controller 200.

The nonvolatile memory device 100 may operate as a storage medium of the data storage device 10. The nonvolatile memory device 100 may be configured with any one of various types of nonvolatile memory devices including a NAND flash memory device, a NOR flash memory device, a ferroelectric random access memory (FRAM) using a ferroelectric capacitor, a magnetic RAM (MRAM) using a tunneling magneto-resistive (TMR) film, a phase change RAM (PRAM) using chalcogenide alloys, and a resistive RAM (ReRAM) using transition metal oxide, depending on memory cells.

Although FIG. 1 illustrates that the data storage device 10 includes one nonvolatile memory device 100, the data storage device 10 may include a plurality of nonvolatile memory devices. The present embodiment may be applied in the same manner to the data storage device 10 including a plurality of nonvolatile memory devices.

The nonvolatile memory device 100 may include a memory cell array having a plurality of memory cells arranged at the respective intersections between a plurality of bit lines and a plurality of word lines. The memory cell array may include a plurality of memory blocks, and each of the memory blocks may include a plurality of pages.

For example, each of the memory cells of the memory cell array may be configured as a single level cell (SLC) capable of storing 1-bit data or a multi-level cell (MLC) capable of storing 2 or more-bit data. The MLC may store 2-bit data, 3-bit data, 4-bit data or the like. In general, a memory cell for storing 2-bit data may be referred to as an MLC, a memory cell for storing 3-bit data may be referred to as a triple level cell (TLC), and a memory cell for storing 4-bit data may be referred to as a quadruple level cell (QLC). However, for convenience, the memory cells for storing 2-bit to 4-bit data will be collectively referred to as MLCs.

The memory cell array may include one or more of the SLC and the MLC. Furthermore, the memory cell array may include memory cells with a two-dimensional structure or memory cells with a three-dimensional structure.

The controller 200 may control overall operations of the data storage device 10 by driving firmware or software loaded to the memory 230. The controller 200 may decode and drive a code-based instruction or algorithm such as firmware or software. The controller 200 may be implemented in hardware or a combination of hardware and software.

The controller 200 may include a host interface 210, a processor 220, a memory 230 and a memory interface 240. Although not illustrated in FIG. 1, the controller 200 may further include an error correction code (ECC) engine which generates parity to data by performing ECC encoding on write data provided from the host device 20, and performs ECC decoding on read data read from the nonvolatile memory device 100 using the parity data.

The host interface 210 may interface the host device 20 and the data storage device 10 according to a protocol. For example, the host interface 210 may communicate with the host device 20 through any one protocol of universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI) and PCI express (PCI-e or PCIe).

The processor 220 may include a micro control unit (MCU) and/or a central processing unit (CPU). The processor 220 may process a request received from the host device 20. In order to process the request received from the host device 20, the processor 220 may drive a code-based instruction or algorithm loaded to the memory 230, i.e. firmware, and control the nonvolatile memory device 100 and internal function blocks such as the host interface 210, the memory 230 and the memory interface 240.

The processor 220 may generate control signals to control an operation of the nonvolatile memory device 100 based on requests received from the host device 20. Further, the processor 220 may provide the generated control signals to the nonvolatile memory device 100 through the memory interface 240.

The memory 230 may be configured as a random access memory (RAM) such as a dynamic RAM (DRAM) or static RAM (SRAM). The memory 230 may store the firmware driven by the processor 220. Furthermore, the memory 230 may store data required for driving the firmware, for example, metadata. That is, the memory 230 may operate as a working memory of the processor 220.

The memory 230 may include a data buffer for temporarily storing write data which are to be transferred from the host device 20 to the nonvolatile memory device 100 or read data which are to be transferred from the nonvolatile memory device 100 to the host device 20. That is, the memory 230 may operate as a buffer memory.

The memory interface 240 may control the nonvolatile memory device 100 under control of the processor 220. The memory interface 240 may also be referred to as a memory controller. The memory interface 240 may provide control signals to the nonvolatile memory device 100. The control signals may include a command, address and operation control signal for controlling the nonvolatile memory device 100. The memory interface 240 may provide data stored in the data buffer of the memory 230 to the nonvolatile memory device 100 or store data received from the nonvolatile memory device 100 in the data buffer.

Figure 2:
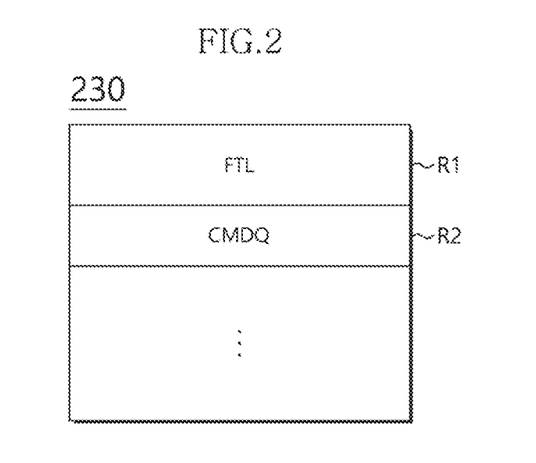
FIG. 2 is a diagram illustrating a memory of FIG. 1.

FIG. 2 is a diagram illustrating the memory 230 of FIG. 1.

Referring to FIG. 2, the memory 230 may include a first region R1 and a second region R2. The first region R1 may store a flash translation layer (FTL). The second region R2 may be used as a command queue CMDQ for queuing a command corresponding to a request received from the host device 20. Although FIG. 2 illustrates the memory 230 including two regions, the memory 230 may include additional regions for various uses, such as a region used as a write data buffer for temporarily storing write data, a region used as a read data buffer for temporarily storing read data, and a region used as a map cache buffer for caching map data.

Referring back to FIG. 1, the memory 230 may include a region for storing system data or metadata. The region may store workload pattern information (WLPI).

When the nonvolatile memory device 100 is configured as a flash memory device, the processor 220 may control a unique operation of the nonvolatile memory device 100, and drive software referred to as the FTL in order to provide device compatibility to the host device 20. As the FTL is driven, the host device 20 may recognize and use the data storage device 10 as a general storage device such as a hard disk.

The FTL may be stored in the first region R1 of the memory 230. The FTL may include modules for performing various functions and metadata required for driving the respective modules. The FTL may be stored in a system region (not illustrated) of the nonvolatile memory device 100. When the data storage device 10 is powered on, the FTL may be read from the system region of the nonvolatile memory device 100, and loaded to the first region R1 of the memory 230.

Figure 3:
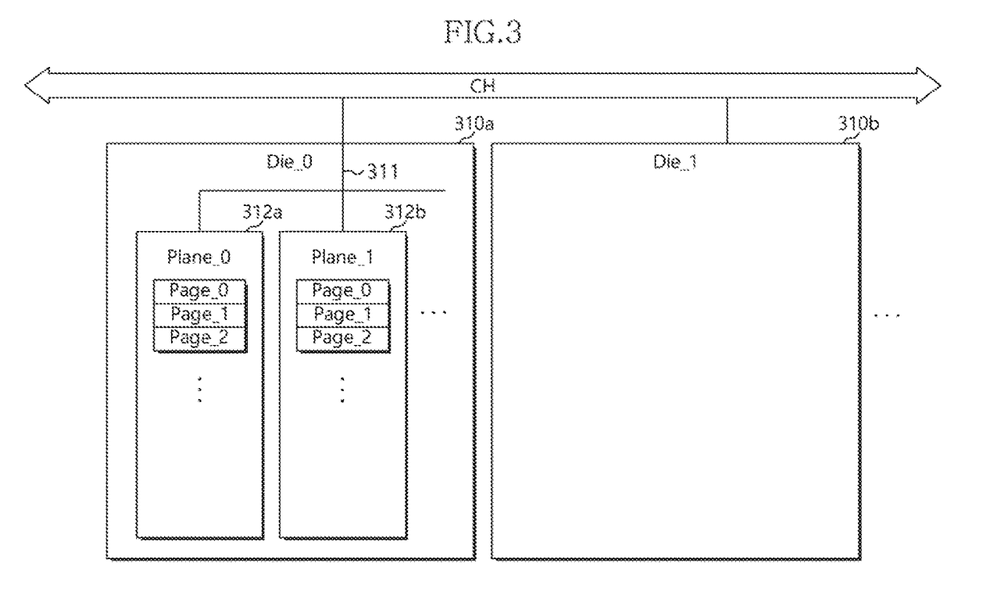
FIG. 3 is a diagram illustrating a data storage region included in a nonvolatile memory device in accordance with an embodiment.

FIG. 3 is a diagram illustrating a data storage region in a nonvolatile memory device (e.g., the nonvolatile memory device 100 of FIG. 1) in accordance with an embodiment.

Referring to FIG. 3, the nonvolatile memory device 100 may include a plurality of dies 310a and 310b which share a channel CH coupled to the controller 200. Each of the dies 310a and 310b may include a plurality of planes 312a and 312b which share a way 311 coupled to the channel CH. Each of the planes 312a and 312b may include a plurality of pages. Each of the pages may indicate the minimum unit of storage region from or to which data is read or written. A plurality of pages which are collectively erased may be referred to as a memory block. A plurality of memory blocks which are managed as one memory block may be referred to as a super block. The data storage region of the nonvolatile memory device 100 may be implemented with a die, a plane, a super block, a memory block, or a page. By way of example, in the following descriptions, the data storage region may be implemented with a page unless otherwise referred.

Figure 4:
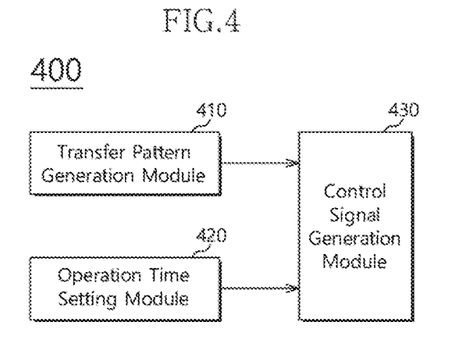
FIG. 4 is a diagram illustrating firmware stored in a memory in accordance with an embodiment.

FIG. 4 is a diagram illustrating firmware 400 of a memory (e.g., the memory 230 of FIG. 1) in accordance with an embodiment.

Referring to FIG. 4, the firmware 400 may include a transfer pattern generation module 410, an operation timing setting module 420 and a control signal generation module 430.

The transfer pattern generation module 410 may generate transfer pattern information of a data exchange status on data exchange between the data storage device 10 and the host device 20. Specifically, the transfer pattern generation module 410 may monitor data exchange between the data storage device 10 and the host device 20, and generate the transfer pattern information on the data exchange based on the monitoring result.

In an embodiment, the transfer pattern generation module 410 may monitor a command receiving operation in which the data storage device 10 receives write, read and erase commands from the host device 20.

In an embodiment, the transfer pattern generation module 410 may monitor a data transfer operation in which the data storage device 10 transfers data to the host device 20 according to a read request of the host device 20.

In an embodiment, the transfer pattern information may include the number of data transfer operations in which the data storage device 10 transfers data to the host device 20 and/or whether the data transfer operations are consecutively performed. For example, the transfer pattern information may include information indicating that four data transfer operations were performed and/or whether data are consecutively received without commands during the four data transfer operations.

In an embodiment, the transfer pattern generation module 410 may generate the transfer pattern information even after operation timing was changed. For example, the transfer pattern generation module 410 may generate the transfer pattern information including information on whether data transfer operations are consecutively performed or commands are received, even after operation timing was changed.

The operation timing setting module 420 may adjust the operation timing of data. Specifically, the operation timing setting module 420 may adjust the operation timing of data which the data storage device 10 will transfer to the host device 20 afterwards, based on the transfer pattern information.

In an embodiment, the operation timing setting module 420 may delay operation timing. For example, when the transfer pattern information indicates that the number of data transfer operations which were consecutively performed is greater than or equal to a preset number, the operation timing setting module 420 may delay the operation timing of data to be transferred afterwards by a preset time. The preset number and the preset time may be differently set for each data storage device 10, and set in a fabrication step or use step of a memory system. Furthermore, the preset time may indicate the time during which the data storage device 10 can receive a command from the host device 20.

In an embodiment, the operation timing setting module 420 may additionally delay the operation timing. For example, the operation timing setting module 420 may gradually delay the operation timing. That is, when no command is received after the operation timing is primarily delayed, the operation timing setting module 420 may secondarily delay the operation timing. The additional delay of the operation timing may be performed until a preset time limit. The preset time limit may be differently set for each data storage device 10, and set in a fabrication step or use step of the memory system.

In an embodiment, the operation timing setting module 420 may restore the operation timing. Specifically, when no command is received from the host device 20 even after the operation timing was delayed by the preset time or until the preset time limit, the operation timing setting module 420 may restore the operation timing to before the operation timing was delayed.

In an embodiment, the operation timing may indicate the time at which the data storage device 10 transfers direct memory access (DMA) setup to the host device 20 in order to read data requested by the host device 20 and transfer the read data to the host device 20.

The control signal generation module 430 may generate a control signal for controlling the operation of the data storage device 10. Specifically, when the operation timing is delayed or restored, the control signal generation module 430 may generate a signal for controlling the host interface 210 to transfer data according to the delayed or restored operation timing. At this time, the host interface 210 may transfer data to the host device 20 at operation timing based on the generated signal.

When a command is received from the host device 20 after the operation timing is delayed, the control signal generation module 430 may generate a signal for controlling the data storage device 10 to queue the received command.

Figure 5:
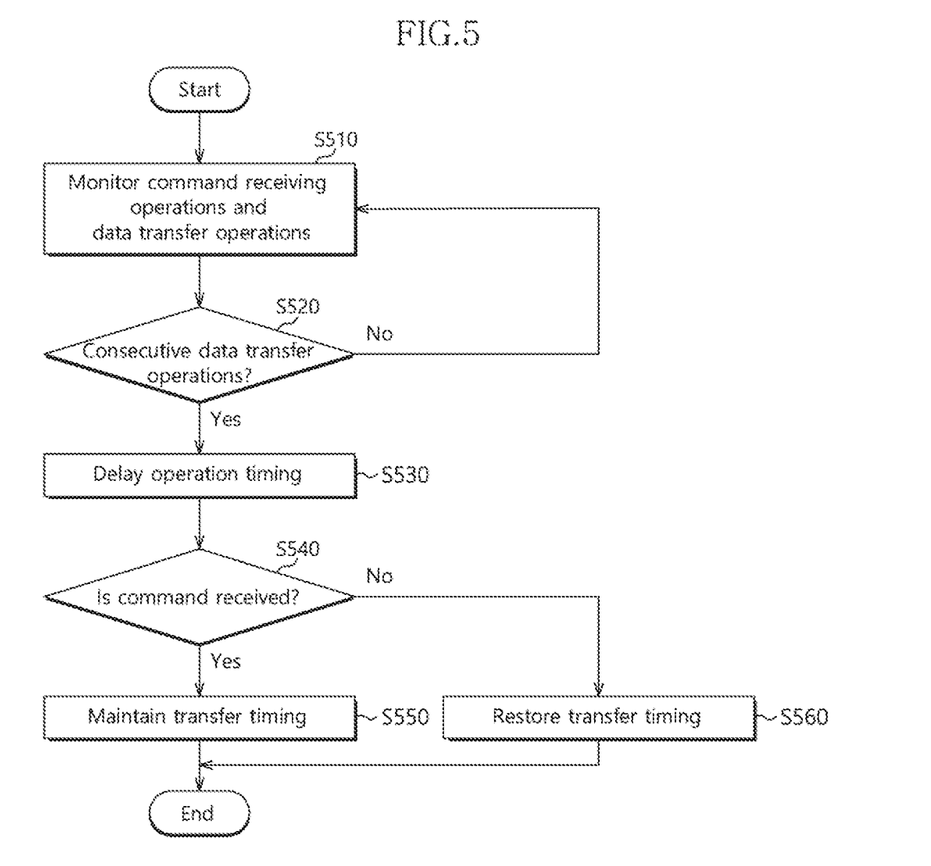
FIG. 5 is a flowchart illustrating an operating method of a data storage device in accordance with an embodiment.

FIG. 5 is a flowchart illustrating an operating method of a data storage device in accordance with an embodiment, for example, the data storage device 10 of FIG. 1.

Referring to FIG. 5, the data storage device 10 may monitor command receiving operations and data transfer operations at step S510. Specifically, the data storage device 10 may monitor command receiving operations and data transfer operations of the host interface 210 coupled to the host device 20 through a half-duplex protocol. Further, the data storage device 10 may generate transfer pattern information indicating the pattern in which the host interface 210 transfers data to the host device 20, based on the monitoring result.

At step S520, the data storage device 10 may determine whether the data transfer operations are consecutively performed. Specifically, the data storage device 10 may determine whether the number of data transfer operations which were consecutively performed is greater than or equal to a preset number, based on the generated transfer pattern information.

When it is determined that the number of data transfer operations which were consecutively performed is less than the preset number, the data storage device 10 may perform step S510 again. When it is determined that the number of data transfer operations which were consecutively performed is greater than or equal to the preset number, the data storage device 10 may perform step S530.

At step S530, the data storage device 10 may delay operation timing. Specifically, when it is determined that the number of data transfer operations which were consecutively performed is greater than or equal to the preset number (S520, Yes), the data storage device 10 may delay the operation timing of data to be transferred afterwards by a preset time.

In an embodiment, the data storage device 10 may sequentially delay the operation timing of the data until a preset time limit.

At step S540, the data storage device 10 may determine whether a command is received. Specifically, the data storage device 10 may determine whether a command was received from the host device 20, after the operation timing of the data to be transferred afterwards was delayed. That is, a situation in which the host device 20 can transfer a command to the data storage device 10 may occur depending on the delayed operation timing. At this time, the data storage device 10 may determine whether the command was received from the host device 20.

At step S550, the data storage device 10 may maintain the operation timing. Specifically, when a command is received from the host device 20 after the operation timing was delayed (S540, Yes), the data storage device 10 may maintain the delayed operation timing. This is because an additional command may be received.

At step S560, the data storage device 10 may restore the operation timing. Specifically, when no command is received from the host device 20 after the operation timing was delayed (S540, No), the data storage device 10 may restore the delayed operation timing to the original operation timing.

Figure 6:
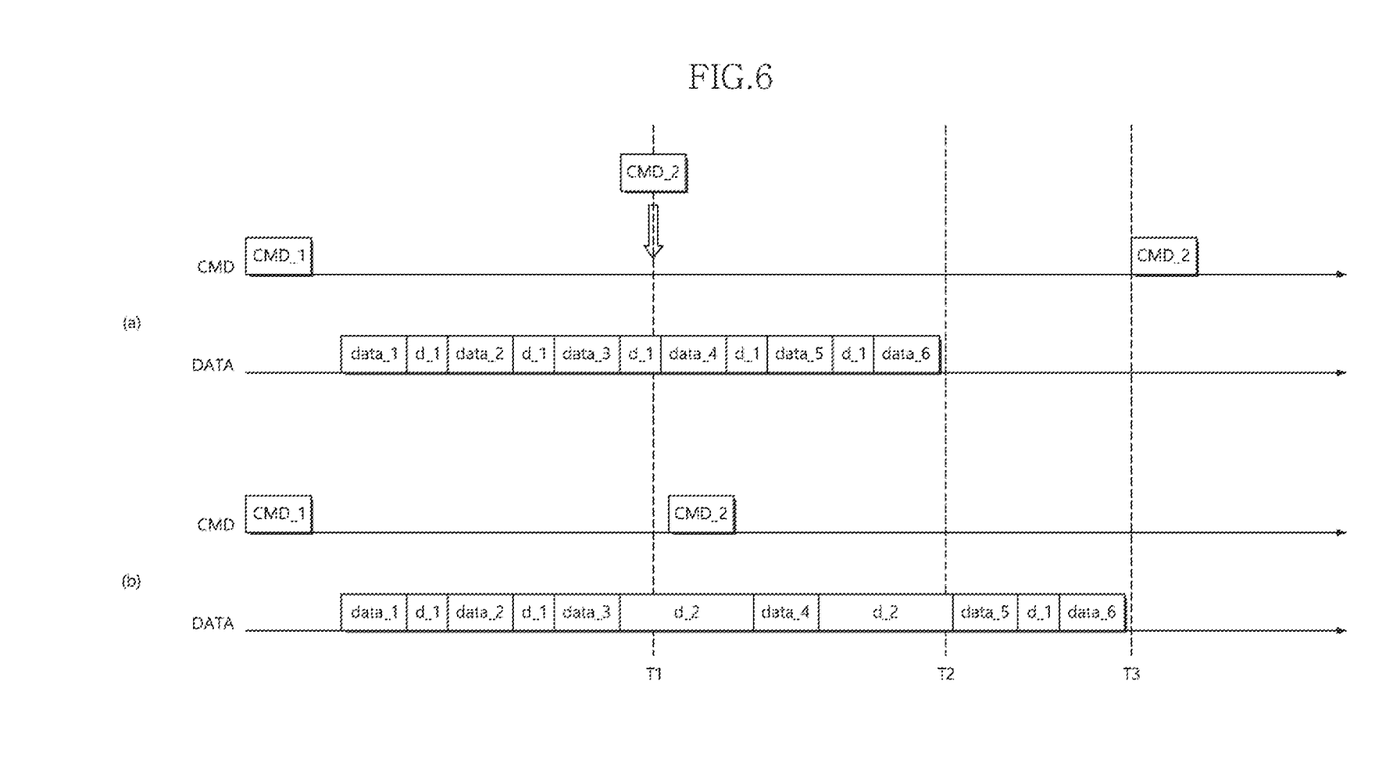
FIG. 6 is a diagram comparatively illustrating an operation of a data storage device in accordance with the present embodiment.

FIG. 6 is a diagram comparatively illustrating an operation of a data storage device (e.g., the data storage device 10) in accordance with the present embodiment.

(a) of FIG. 6 illustrates timings of conventional command receiving operations and conventional data transfer operations, while (b) of FIG. 6 illustrates timings of command receiving operations and data transfer operations in accordance with the present embodiment. (a) and (b) of FIG. 6 illustrate the situation in which the host device 20 intends to transfer a second command CMD_2 to the data storage device 10 at first time T1. Specifically, in (a) of FIG. 6, the data transfer operations may be performed at intervals of first delay time d_1, and the first delay time d_1 may be shorter than time required for receiving a command. Thus, since the data storage device 10 cannot receive the second command CMD_2 from the host device 20 at first time T1, the data storage device 10 cannot help but receive the second command CMD_2 after data are completely transferred up to sixth data data_6. Therefore, since the data storage device 10 cannot help but start an operation for executing the second command CMD_2 after the data are completely transferred up to the sixth data data_6, the second command CMD_2 may be delayed.

In contrast, in (b) of FIG. 6, the data transfer operations were performed three times in a row (data_1 to data_3), and the operation timings of fourth data (data_4) and the following data (data_5, and data_6) were delayed to change the data transfer interval from the first delay time d_1 to a second delay time d_2. Since the second delay time d_2 is enough for the data storage device 10 to receive the second command CMD_2 from the host device 20, the data storage device 10 may receive the second command CMD_2 from the host device 20 at first time T1. At this time, since the data storage device 10 received the command in advance during the data transfer operation, the data storage device 10 may start to prepare for processing a command which is received while the fourth to sixth data (data_4 to data_6) are transferred. Thus, the input/output performance of the data storage device 10 may be improved. However, when no command is received from the host device 20 at times T1 and T2, the data storage device 10 may restore the operation timing from the second delay time d_2 to the first delay time d_1.

Figure 7:
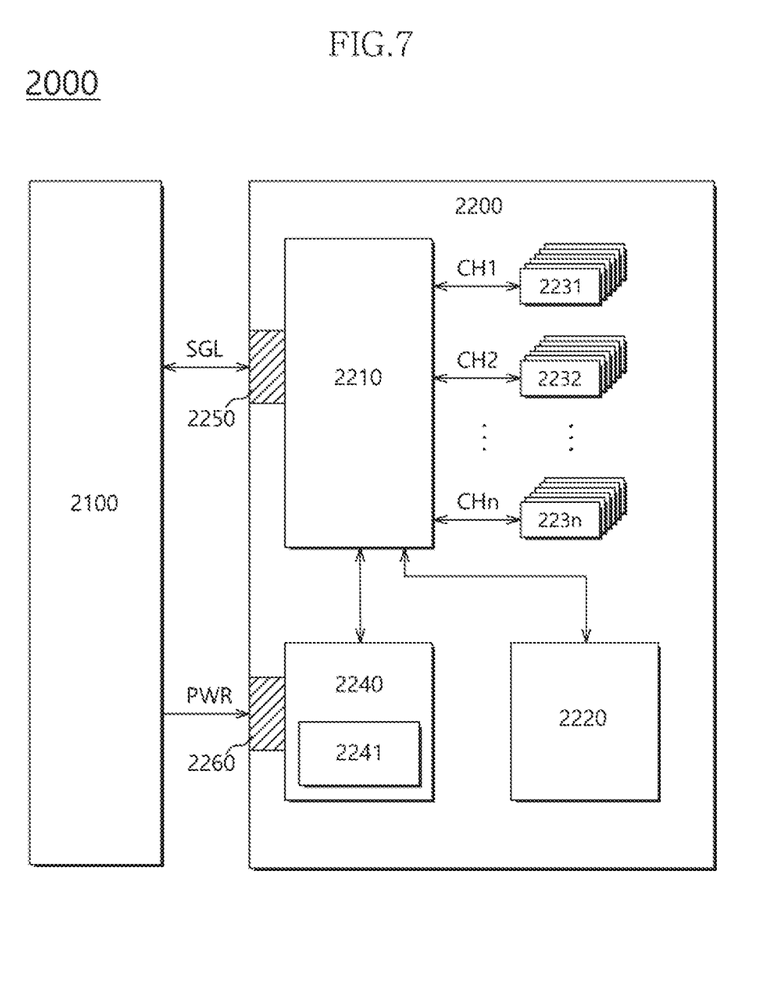
FIG. 7 is a diagram illustrating a data processing system including a solid state drive (SSD) in accordance with an embodiment.

FIG. 7 illustrates a data processing system 2000 including a solid state drive (SSD) 2200 in accordance with an embodiment. Referring to FIG. 7, the data processing system 2000 may include a host device 2100 and the SSD 2200.

The SSD 2200 may include a controller 2210, a buffer memory device 2220, nonvolatile memory devices 2231 to 223n, a power supply 2240, a signal connector 2250 and a power connector 2260.

The controller 2210 may control overall operations of the SSD 2200.

The buffer memory device 2220 may temporarily store data which are to be stored in the nonvolatile memory devices 2231 to 223n. Furthermore, the buffer memory device 2220 may temporarily store data read from the nonvolatile memory devices 2231 to 223n. The data which are temporarily stored in the buffer memory device 2220 may be transferred to the host device 2100 or the nonvolatile memory devices 2231 to 223n under control of the controller 2210.

The nonvolatile memory devices 2231 to 223n may be used as storage media of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to one channel may be coupled to the same signal bus and data bus.

The power supply 2240 may provide power PWR inputted through the power connector 2260 into the SSD 2200. The power supply 2240 may include an auxiliary power supply 2241. The auxiliary power supply 2241 may supply power to normally turn off the SSD 2200, when a sudden power off occurs. The auxiliary power supply 2241 may include large capacitors capable of storing power PWR.

The controller 2210 may exchange signals SGL with the host device 2100 through the signal connector 2250. The signal SGL may include a command, address, data and the like. The signal connector 2250 may be configured as various types of connectors depending on an interface method between the host device 2100 and the SSD 2200.

Figure 8:
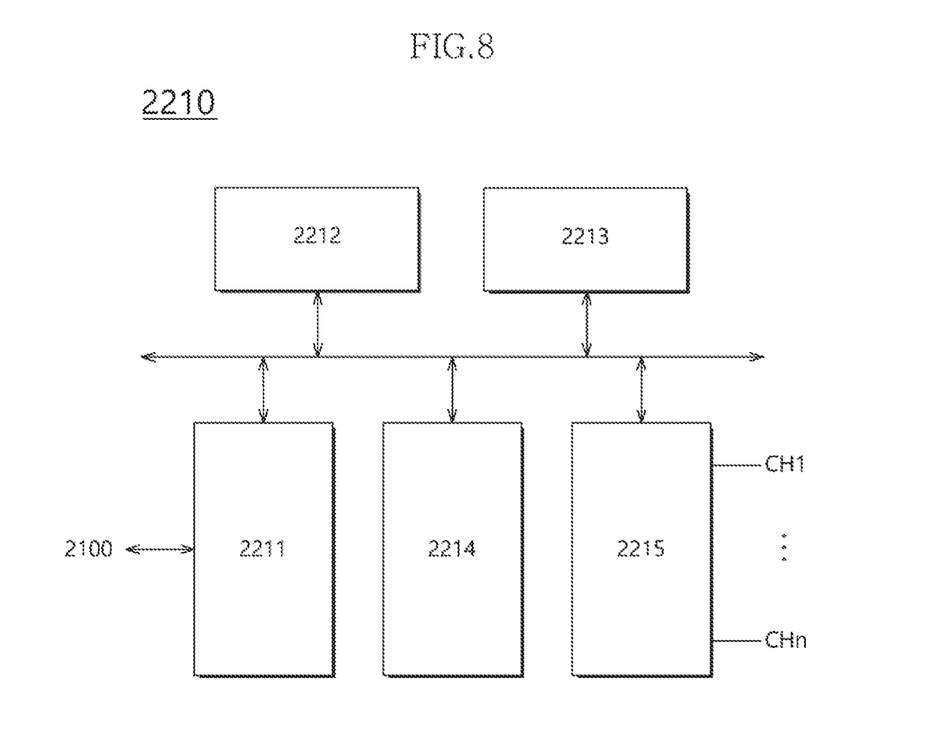
FIG. 8 is a diagram illustrating a controller of FIG. 7.

FIG. 8 illustrates the controller 2210 of FIG. 7. Referring to FIG. 8, the controller 2210 may include a host interface unit 2211, a control unit 2212, a random access memory (RAM) 2213, an error correction code (ECC) unit 2214 and a memory interface unit 2215.

The host interface unit 2211 may interface the host device 2100 and the SSD 2200 according to a protocol of the host device 2100. For example, the host interface unit 2211 may communicate with the host device 2100 through any one protocol of secure digital, Universal Serial Bus (USB), Multi-Media Card (MMC), Embedded MMC (eMMC), Personal Computer Memory Card International Association (PCMCIA), Parallel Advanced Technology Attachment (PATA), Serial Advanced Technology Attachment (SATA), Small Computer System Interface (SCSI), Serial Attached SCSI (SAS), Peripheral Component Interconnection (PCI), PCI Express (PCIe) and Universal Flash Storage (UFS). The host interface unit 2211 may perform a disk emulation function which supports the host device 2100 to recognize the SSD 2200 as a universal data storage device, for example, a hard disk drive (HDD).

The control unit 2212 may analyze and process the signal SGL inputted from the host device 2100. The control unit 2212 may control operations of internal function blocks according to firmware or software for driving the SSD 2200. The RAM 2213 may be used as a working memory for driving such firmware or software.

The ECC unit 2214 may generate parity data of the data which are to be transferred to the nonvolatile memory devices 2231 to 223n. The generated parity data and the data may be stored in the nonvolatile memory devices 2231 to 223n. The ECC unit 2214 may detect an error of data read from the nonvolatile memory devices 2231 to 223n based on the parity data. When the detected error falls within a correctable range, the ECC unit 2214 may correct the detected error.

The memory interface unit 2215 may provide a control signal such as a command and address to the nonvolatile memory devices 2231 to 223n, under control of the control unit 2212. The memory interface unit 2215 may exchange data with the nonvolatile memory devices 2231 to 223n, under control of the control unit 2212. For example, the memory interface unit 2215 may provide data stored in the buffer memory device 2220 to the nonvolatile memory devices 2231 to 223n, or provide data read from the nonvolatile memory devices 2231 to 223n to the buffer memory device 2220.

Figure 9:
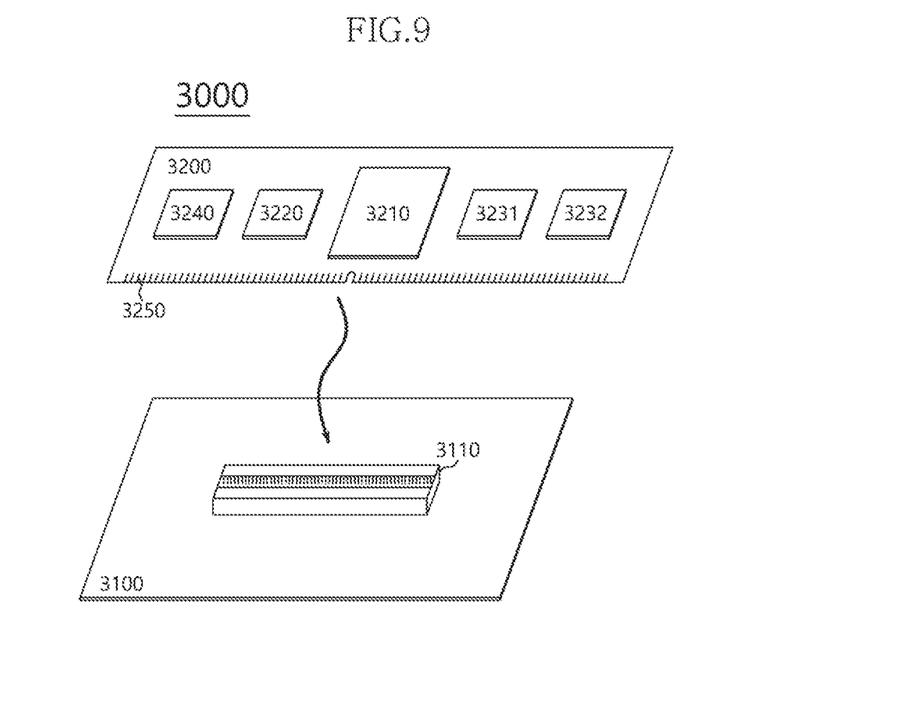
FIG. 9 is a diagram illustrating a data processing system including a data storage device in accordance with an embodiment.

FIG. 9 illustrates a data processing system 3000 including a data storage device 3200 in accordance with an embodiment. Referring to FIG. 9, the data processing system 3000 may include a host device 3100 and the data storage device 3200.

The host device 3100 may be configured as a board such as a PCB. Although not illustrated, the host device 3100 may include internal function blocks for performing a function of the host device.

The host device 3100 may include a connection terminal 3110 such as a socket, slot or connector. The data storage device 3200 may be mounted on the connection terminal 3110.

The data storage device 3200 may be configured as a board such as a PCB. The data storage device 3200 may be referred to as a memory module or memory card. The data storage device 3200 may include a controller 3210, a buffer memory device 3220, nonvolatile memory devices 3231 and 3232, a power management integrated circuit (PMIC) 3240 and a connection terminal 3250.

The controller 3210 may control overall operations of the data storage device 3200. The controller 3210 may be configured in the same manner as the controller 2210 illustrated in FIG. 8.

The buffer memory device 3220 may temporarily store data which are to be stored in the nonvolatile memory devices 3231 and 3232. Furthermore, the buffer memory device 3220 may temporarily store data read from the nonvolatile memory devices 3231 and 3232. The data which are temporarily stored in the buffer memory device 3220 may be transferred to the host device 3100 or the nonvolatile memory devices 3231 and 3232 under control of the controller 3210.

The nonvolatile memory devices 3231 to 3232 may be used as storage media of the data storage device 3200.

The PMIC 3240 may provide power inputted through the connection terminal 3250 into the data storage device 3200. The PMIC 3240 may manage the power of the data storage device 3200 under control of the controller 3210.

The connection terminal 3250 may be coupled to the connection terminal 3110 of the host device 3100. Through the connection terminal 3250, signals and power may be transferred between the host device 3100 and the data storage device 3200, the signals including a command, address, data and the like. The connection terminal 3250 may be configured in various manners depending on an interface method between the host device 3100 and the data storage device 3200. The connection terminal 3250 may be disposed at any one side of the data storage device 3200.

Figure 10:
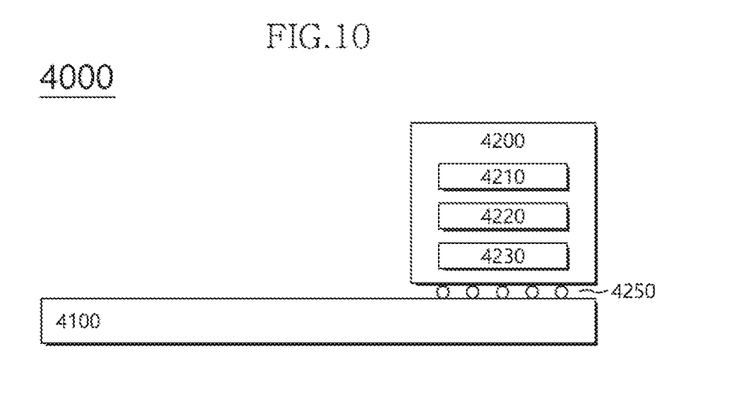
FIG. 10 is a diagram illustrating a data processing system including a data storage device in accordance with an embodiment.

FIG. 10 illustrates a data processing system 4000 including a data storage device 4200 in accordance with an embodiment. Referring to FIG. 13, the data processing system 4000 may include a host device 4100 and the data storage device 4200.

The host device 4100 may be configured as a board such as a PCB. Although not illustrated, the host device 4100 may include internal function blocks for performing a function of the host device.

The data storage device 4200 may be configured as a surface mount package. The data storage device 4200 may be mounted on the host device 4100 through solder balls 4250. The data storage device 4200 may include a controller 4210, a buffer memory device 4220 and a nonvolatile memory device 4230.

The controller 4210 may control overall operations of the data storage device 4200. The controller 4210 may be configured in the same manner as the controller 2210 illustrated in FIG. 8.

The buffer memory device 4220 may temporarily store data which are to be stored in the nonvolatile memory device 4230. Furthermore, the buffer memory device 4220 may temporarily store data read from the nonvolatile memory device 4230. The data which are temporarily stored in the buffer memory device 4220 may be transferred to the host device 4100 or the nonvolatile memory device 4230 under control of the controller 4210.

The nonvolatile memory device 4230 may be used as a storage medium of the data storage device 4200.

Figure 11:
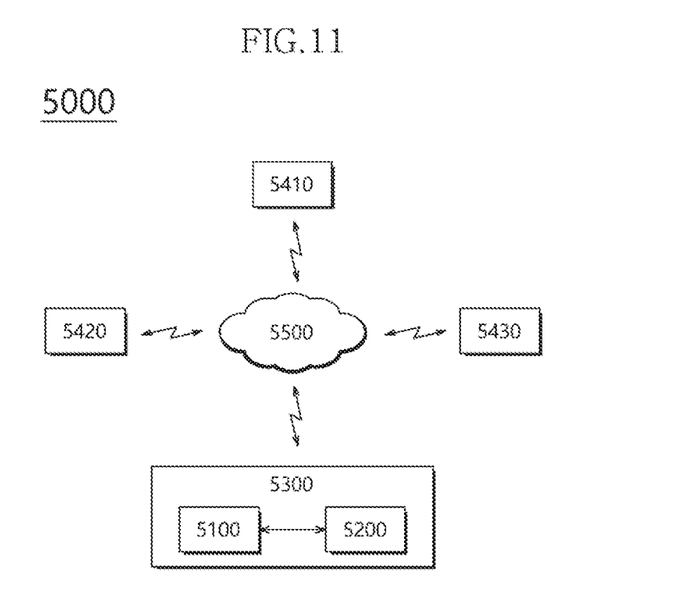
FIG. 11 is a diagram illustrating a network system including a data storage device in accordance with an embodiment.

FIG. 11 illustrates a network system 5000 including a data storage device in accordance with an embodiment of the present invention. Referring to FIG. 11, the network system 5000 may include a server system 5300 and a plurality of client systems 5410, 5420 and 5430 which are connected through a network 5500.

The server system 5300 may provide data in response to requests of the plurality of client systems 5410, 5420 and 5430. For example, the server system 5300 may store data provided from the plurality of client systems 5410, 5420 and 5430. For another example, the server system 5300 may provide data to the plurality of client systems 5410, 5420 and 5430.

The server system 5300 may include a host device 5100 and a data storage device 5200. The data storage device 5200 may be configured as the data storage device 10 of FIG. 1, the data storage device 2200 of FIG. 7, the data storage device 3200 of FIG. 9 or the data storage device 4200 of FIG. 10.

Figure 12:
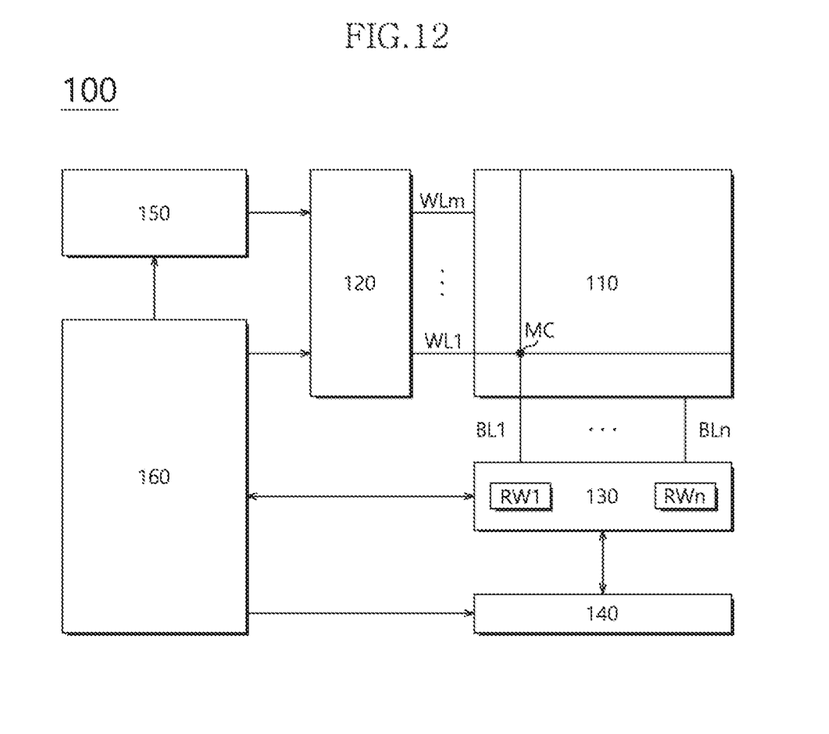
FIG. 12 is a block diagram illustrating a nonvolatile memory device included in a data storage device in accordance with an embodiment.

FIG. 12 is a block diagram illustrating a nonvolatile memory device 100 in a data storage device in accordance with an embodiment. Referring to FIG. 12, the nonvolatile memory device 100 may include a memory cell array 110, a row decoder 120, a column decoder 130, a data read and write (read/write) block 140, a voltage generator 150 and a control logic 160.

The memory cell array 110 may include memory cells MC arranged at the respective intersections between word lines WL1 to WLm and bit lines BL1 to BLn.

The row decoder 120 may be coupled to the memory cell array 110 through the word lines WL1 to WLm. The row decoder 120 may operate under control of the control logic 160. The row decoder 120 may decode an address provided from an external device (not illustrated). The row decoder 120 may select and drive the word lines WL1 to WLm based on the decoding result. For example, the row decoder 120 may provide word line voltages provided from the voltage generator 150 to the word lines WL1 to WLm.

The data read/write block 140 may be coupled to the memory cell array 110 through the bit line BL1 to BLn. The data read/write block 140 may include read/write circuits RW1 to RWn corresponding to the respective bit line BL1 to BLn. The data read/write block 140 may operate under control of the control logic 160. The data read/write block 140 may operate as a write driver or sense amplifier depending on operation modes. For example, the data read/write block 140 may operate as a write driver which stores data provided from the external device in the memory cell array 110, during a write operation. For another example, the data read/write block 140 may operate as a sense amplifier which reads data from the memory cell array 110, during a read operation.

The column decoder 130 may operate under control of the control logic 160. The column decoder 130 may decode an address provided from the external device. The column decoder 130 may couple the read/write circuits RW1 to RWn of the data read/write block 140, corresponding to the respective bit lines BL1 to BLn, to a data input/output line (or data input/output buffer) according to the decoding result.

The voltage generator 150 may generate a voltage which is used for an internal operation of the nonvolatile memory device 100. The voltages generated by the voltage generator 150 may be applied to the memory cells of the memory cell array 110. For example, a program voltage generated during a program operation may be applied to a word line of memory cells on which the program operation is to be performed. For another example, an erase voltage generated during an erase operation may be applied to well regions of memory cells on which the erase operation is to be performed. For another example, a read voltage generated during a read operation may be applied to a word line of memory cells on which the read operation is to be performed.

The control logic 160 may control overall operations of the nonvolatile memory device 100 based on a control signal provided from the external device. For example, the control logic 160 may control an operation of the nonvolatile memory device 100, such as a read, write or erase operation of the nonvolatile memory device 100.

In accordance with the present embodiments, it is possible to improve the input/output performance of the data storage device.

While various embodiments have been described above, it will be understood to those skilled in the art that the embodiments described are examples only. Accordingly, the controller and the operating method which are described herein should not be limited based on the described embodiments.

What is claimed is:

1. A controller of a data storage device comprising:
a host interface configured to perform data communication with a host device;
a memory configured to store firmware for controlling an operation of the host interface; and
a processor configured to load the firmware to control the operation of the host interface,
wherein the firmware generates transfer pattern information regarding previous data transfer operations by monitoring data transfer statuses between the host interface and the host device, adjusts an operation timing of the host interface based on the generated transfer pattern information, and controls the host interface to perform a current data transfer operation according to the adjusted operation timing.

2. The controller according to claim 1, wherein the firmware delays the operation timing by a preset time such that the host interface receives a command from the host device before the current data transfer operation.

3. The controller according to claim 2, wherein the transfer pattern information comprises the number of the previous data transfer operations and the consecutiveness of the previous data transfer operations.

4. The controller according to claim 3, wherein, when the generated transfer pattern information indicates that the number of the previous data transfer operations which were consecutively performed is greater than or equal to a preset number, the firmware delays the operation timing.

5. The controller according to claim 4, wherein, when the command is received from the host device for the preset time, the firmware controls the host interface to queue the received command.

6. The controller according to claim 4, wherein, when no command is received from the host device for the preset time, the firmware restores the delayed operation timing.

7. The controller according to claim 1, wherein the operation timing includes a direct memory access (DMA) setup transfer time for the current data transfer operation.

8. An operating method of a data storage device which includes a host interface for data communication with a host device, the operating method comprising:
generating transfer pattern information regarding previous data transfer operations by monitoring data transfer statuses between the host interface and the host device;
adjusting an operation timing of the host interface based on the generated transfer pattern information; and
controlling the host interface to perform a current data transfer operation according to the adjusted operation timing.

9. The operating method according to claim 8, wherein the adjusting of the operation timing comprises delaying the operation timing by a preset time such that the host interface receives a command from the host device before the current data transfer operation.

10. The operating method according to claim 9, wherein the transfer pattern information comprises the number of the previous data transfer operations and the consecutiveness of the previous data transfer operations.

11. The operating method according to claim 10, wherein the delaying of the operation timing comprises delaying the operation timing, when the generated transfer pattern information indicates that the number of the previous data transfer operations which were consecutively performed is greater than or equal to a preset number.

12. The operating method according to claim 11, further comprising queuing the command, when the command is received from the host device for the preset time.

13. The operating method according to claim 11, further comprising restoring the delayed operation timing, when no command is received from the host device for the preset time.

14. The operating method according to claim 8, wherein the operation timing includes a direct memory access (DMA) setup transfer time for the current data transfer operation.

15. A data processing system comprising:
   a host device suitable for consecutively transferring a plurality of data with an interval, and transferring a command during transferring of the plurality of data; and
   a controller suitable for:
   monitoring a transfer pattern of the plurality of data between the host device and the processor;
   adjusting the interval based on the monitored transfer pattern; and
   receiving the command from the host device based on the adjusted interval.

* * * * *